INPUT-OUTPUT SECTION

Filed Sept. 4, 1962 2 Sheets-Sheet 1

INVENTOR.
CARL M. LEKVEN
BY
ATTORNEY

INPUT-OUTPUT SECTION

Filed Sept. 4, 1962 2 Sheets-Sheet 2

United States Patent Office 3,309,671

Patented Mar. 14, 1967

3,309,671

INPUT-OUTPUT SECTION

Carl M. Lekven, Burbank, Calif., assignor to General Precision, Inc., a corporation of Delaware

Filed Sept. 4, 1962, Ser. No. 221,126
3 Claims. (Cl. 340—172.5)

The present invention relates to electronic digital computers, and the like, and it relates more particularly to an improved buffer system for use in the input/output section of such a computer.

Copending application Ser. No. 203,985, filed June 20, 1962, discloses an improved electronic digital computer which is constructed to incorporate an arithmetic section in which all information is circulated in a serial interlaced manner through a single register.

As described in the copending application, the single circulating register of the computer described therein replaces the several registers required in the arithmetic section of the usual prior art computer.

The computer described in the copending application uses an ultrasonic delay line as a component of the single interlaced circulating register in the arthmetic section. As pointed out in the copending case, recent advances in delay line technology have shown the feasibility of storing digital information directly in glass or in fused quartz delay lines. These delay lines are presently available with delays from 20 to 150 microseconds, and with operating rates up to approximately 30 megabits per second. The use of such a delay line in the arthmetic section circulating register of the computer enables extremely high operating speeds to be realized.

The improved input/output buffer system of the present invention also includes a circulating register, and the circulating register may incorporate an ultrasonic delay line of the type described above. Such an interlaced technique is used in the improved buffer system of the invention to store a plurality of equal length multi-digit binary words in a digit-interlaced relationship in the buffer.

The words stored in the buffer of the invention represent the usual information for use in the computer. However, in the embodiment to be described, one bit of each word is used for addressing and control purposes. These latter bits of a plurality of words cooperate to form, for example, a multi-bit control word. The resulting control word may be used, for example, to select an input or output device, or to serve as a group address for all the information words in the buffer. This self-addressing feature of the group of information words in the buffer simplifies to a large extent the associated logic circuitry and enhances greatly the versatility of the system.

An object of the invention, therefore, is to provide an improved high speed, self-addressing, working storage input-output buffer.

Another object of the invention is to provide such an improved input/output buffer which is simple and straightforward in its construction.

Yet another object is to provide such an improved input/output buffer which is flexible, in that its capacity can be varied by means of a simple mechanical adjustment, and without the necessity of altering its associated circuitry or components in any manner.

Additional features and advantages of the invention will become apparent from a consideration of the following description in conjunction with the accompanying drawings, in which.

Figure 1:
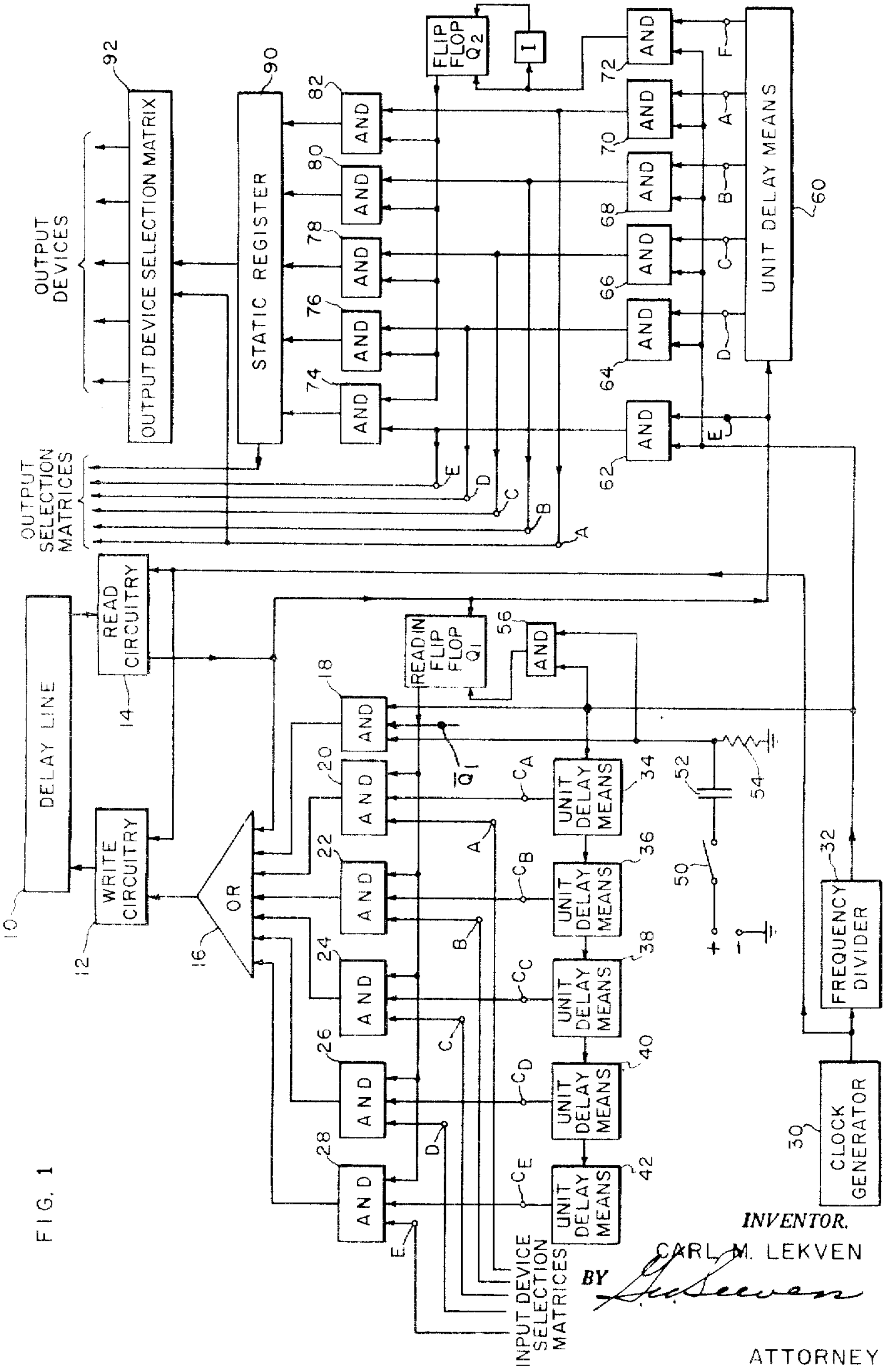
FIGURE 1 is a schematic block diagram of an input/output buffer incorporating the concepts of the invention.

The buffer system of FIGURE 1 includes a delay line 10. As mentioned above, this delay line may be formed of fused quartz, or fused silica, and it is in the form of an elongated rod. A pair of quartz crystals (not shown) are affixed to the respective ends of the rod to function respectively as electro-acoustical read and write transducers. Appropriate write circuitry 12 is coupled to the write transducer at one end of the delay line 10, and appropriate read circuitry 14 is coupled to the read transducer at the other end of the delay line.

An "or" gate 16 is coupled to the write circuitry 12, and a plurality of "and" gates 18, 20, 22, 24, 26 and 28 are coupled to the "or" gate 16.

The system includes a clock generator 30. This generator may be constructed in any appropriate known manner so as to generate clock pulses C at a predetermined repetition frequency.

It is preferred that the clock generator 30 be constructed so that the generated clock pulses may have a precisely stable repetition frequency. The clock pulses C are introduced to the write circuitry 12 and to the read circuitry 14 to clock the information circulated through the delay line 10.

The clock pulses C are divided by a 6:1 frequency divider 32 to establish a series of sub-multiple clock pulses C/6. The sub-multiple clock pulses C/6 are passed through a series of unit delay means 34, 36, 38, 40, 42 which are connected to respective ones of the "and" gates 20, 22, 24, 26 and 28. The sub-multiple clock pulses C/6 are directly introduced to the "and" gate 18.

It will be appreciated that the "and" gates 18, 20, 22, 24, 26 and 28 are enabled at successive C bit times and at a cyclic repetition rate of C/6. For each cycle, the "and" gate 18 is enabled first, and at successive C bit times, the "and" gates 20, 22, 24, 26 and 28 are successively enabled. A read-in flip-flop $Q_1$ is provided, and the read circuitry 14 is connected to the reset input terminal of the flip-flop. The set output terminal of the flip-flop $Q_1$ is connected to the "and" gates 20, 22, 24, 26 and 28. This means that the "and" gates 20, 22, 24, 26 and 28 are enabled, only when the flip-flop $Q_1$ is in its set state. The reset output terminal of the flip-flop $Q_1$ is connected to the "and" gate 18.

Input terminals designated A, B, C, D and E are connected to respective ones of the "and" gates 20, 22, 24, 26 and 28. These input terminals may be connected, for example, to appropriate circuitry in an associated computer, so that selected information may be read into the buffer of the invention, as established by an address control word included in the information presently in the buffer, as will be described. Alternately, the input terminals A, B, C, D and E may be connected to appropriate input devices through selection matrices which are controlled by the control word of the information presently in the buffer system, as will also be described.

The system of FIGURE 1 includes a start switch 50 which is connected to the positive terminal of a source of direct current voltage. The negative terminal of the source may be grounded. The other terminal of the switch 50 is connected to a capacitor 52 which, in turn, is connected to a grounded resistor 54. The capacitor 52 is also connected to the "and" gate 18 and to an "and" gate 56. The "and" gate 56 is connected to the set input terminal of the flip-flop $Q_1$. The C/6 sub-multiple clock pulses are also introduced to the flip-flop $Q_1$ for clocking purposes.

The read circuitry 14 is further connected to the "or" gate 16 for recirculation purposes, and the read circuitry is also connected to a unit delay means 60. The unit delay means 34, 36, 38, 40 and 42 are represented as separate units, and each is considered to impart a delay to the clock pulses passed therethrough corresponding to a C bit time.

The separate unit delay means may, for example, be flip-flops, as may the unit delay means 60. Conversely, either of these unit delay means may be in the form of usual delay lines, with appropriate taps corresponding to C bit time delays. The unit delay means 60 has taps D, C, B, A, F, each corresponding to a unit C bit time delay. These taps, together with a further connection E from its input terminal, are connected to respective ones of a plurality of "and" gates 62, 64, 66, 68, 70 and 72. The C/6 submultiple clock pulses are also applied to the "and" gates.

The "and" gates 62, 64, 66, 68 and 70 are connected respectively to a further plurality of "and" gates 74, 76, 78, 80 and 82. The "and" gates 74, 76, 78, 80 and 82 are connected to a register 90 which may, for example, be a usual flip-flop static register.

A flip-flop $Q_2$ is included in the system. The "and" gate 72 is connected to the set input terminal of the flip-flop $Q_2$, and through an inverter network I to the reset input terminal of the flip-flop. The set output terminal of the flip-flop $Q_2$ is connected to the "and" gates 74, 76, 78, 80 and 82. The "and" gates 70, 68, 66, 64 and 62 are connected to respective ones of a plurality of output terminals designated A, B, C, D and E respectively. These output terminals may be connected, for example, to individual output device selection matrices, such as the selection matrix 92.

Each output device selection matrix, such as the matrix 92, may be under the control of the static register 90. Each selection matrix, such as the matrix 92, may be connected to a plurality of different output devices, and the control word in the static register 90 is used to control the selection matrix 92 to select the output device to which the information at the terminal, such as the terminal A, is to be applied.

For input operation, the output terminals A, B, C, D and E may be connected to logic circuitry in the computer, which circuitry responds to the information in the static register 90 to determine the destination of the different information words appearing at these terminals.

Figure 2:
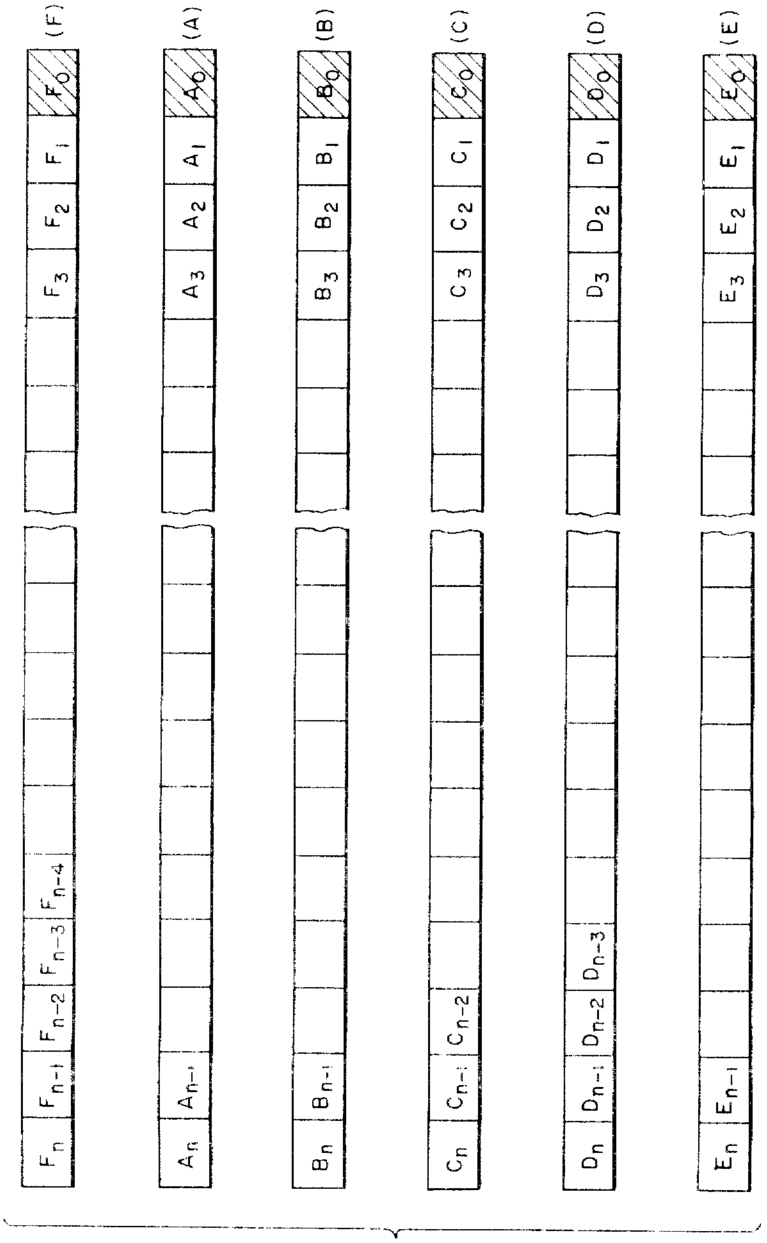
FIGURE 2 is a diagrammatic representation of the various multi-bit binary words which may be stored in the buffer of FIGURE 1.

The information stored in the system of FIGURE 1 may be in the form of multi-bit binary information words, such as shown in FIGURE 2. In the representation of FIGURE 2, it is assumed that five different information words A–E are stored in the buffer, and that a separate first control word F is also stored in the buffer.

As shown in FIGURE 2, each of the information words is composed of *n* binary bits, and these bits are designated $A_0$–$A_n$, respectively.

Figure 3:
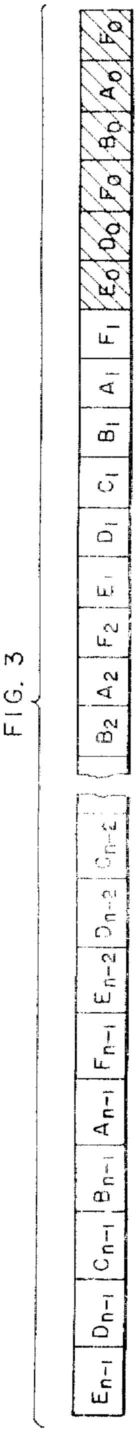
FIGURE 3 is a diagrammatic representation of the bit-interlaced relationship in which the different words of FIGURE 2 are stored in the buffer system of FIGURE 1.

The information words are stored in the system in a bit interlaced manner, such as shown in FIGURE 3. It will be observed that each of the bits of the five information words A–E, and of the first control word F, are interlaced with one another. In accordance with the teaching of the present invention, a selected bit from each word, such as the $A_0$, $B_0$, $C_0$, $D_0$ and $E_0$ bits are used to form a separate second control word which can be used to perform control, and selection functions. Moreover, the second control word may be used to constitute an address word for the group of information words in the buffer, or for the next group of words to be fed into the buffer.

The first control word F includes a unit digit at the $F_0$ bit position, and all other digits of that word are zero. This function may be supplied by an external device and a lesser number of registers, with a corresponding decrease in sub-multiple clock pulses that may be used without violating the spirit of the invention. The control word F is used for timing purposes, and it designates each circulation of information through the system of FIGURE 1.

To initiate the operation of the buffer system, the start switch 50 is closed momentarily and then opened. The resulting charge flowing into the capacitor 52 produces a sharp signal at the "and" gates 18 and 56. The next C/6 sub-multiple clock pulse from the frequency divider 32 is passed through these "and" gates to set a one into the $F_0$ bit position in the delay line 10, and to set the read flip-flop $Q_1$ to its set state.

The "and" gates 20, 22, 24, 26 and 28 are all conditioned for conduction by the flip-flop $Q_1$. Assuming now that the $A_0$, $B_0$, $C_0$, $D_0$ and $E_0$ bits of the different multi-bit information words are now all available at the corresponding input terminals, A, B, C, D and E; the successive enabling of the "and" gates 20, 22, 24, 26 and 28 causes these bits to be introduced into the delay line 10 at the proper bit positions, to assume the relationship shown in FIGURE 3.

Then, successive C/6 sub-multiple clock pulses from the frequency divider 32 permit the successive digits of the information words to be properly introduced into the delay line 10. It will be appreciated that, after the first unity bit has been introduced into the $F_0$ bit position, the flip-flop $Q_1$ is set so that the "and" gate 18 is disabled. This means that each successive bit of the F control word will be a binary zero.

The loading of the system continues until the unit $F_0$ bit appears at the read circuitry 14, at which time the flip-flop $Q_1$ is reset to its original state. The information loaded into the delay line 10 now recirculates through the buffer system, by way of the connection from the read circuitry 14 to the "or" gate 16.

The information circulating through the buffer system is also introduced to the unit delay means 60 and to the "and" gates 62, 64, 66, 68, 70 and 72. The keying of the "and" gates by the sub-multiple clock pulses C/6 from the frequency divider 32 causes the different multi-bit binary information words to appear at the various output terminals A, B, C, D and E. The F control word appears at the output terminal of the "and" gate 72. When the unit $F_0$ bit appears at the output terminal, the flip-flop $Q_2$ is triggered to its set state, so as to enable the "and" gates 74, 76, 78, 80 and 82. These gates simultaneously pass the $A_0$, $B_0$, $C_0$, $D_0$ and $E_0$ bits to the static register 90, after which the flip-flop $Q_2$ is returned to its reset state by the passage of the next zero pulse through the inverter network I.

Therefore, the $A_0$, $B_0$, $C_0$, $D_0$ and $E_0$ bits are stored in the static register 90. These bits are used to form a second control word, and the static register 90 is set to a configuration corresponding to the particular control to be represented by that word. As mentioned above, the control word in the static register may be used to operate a selection matrix, such as the matrix 92, so as to select a particular output device which is to receive the information A. The control word in the static register 90 may also be used to actuate other selection matrices, so that the information words B, C, D and E may be fed to selected output devices.

As also mentioned, the control word in the static register may be used for addressing purposes, and it may be compared with other address words in the associated computer, to determine the destination of the information in the buffer, or to determine subsequent information to be fed into the buffer.

An appropriate gate may be included in the connection between the read circuitry 14 and the "or" gate 16. This gate would be controlled to break the connection whenever the buffer system is to be cleared, so as to permit new information to be entered into the system.

The invention provides, therefore, a simplified input/output buffering system which is constructed to incorporate a self-addressing feature, which is particularly useful for achieving a variety of controls in a simplified manner, and without the need for excessively complicated control circuitry.

While a particular embodiment of the invention has been shown and described, modifications may be made, and it is intended in the claims to cover all such modifications as fall within the spirit and scope of the invention.

What is claimed is:

1. A buffer circuit including: dynamic register means including delay means for circulating bits of binary data in a series of successive bit positions, said binary data including a plurality of multi-bit binary information words carried in said delay means in a bit-interlaced relationship with one another, at least one of the bits in each of said binary information words forming with one another a multi-bit binary coded control word; a plurality of input channels for receiving separate multi-bit binary information words; circuit means for scanning said input channels successively to introduce the bits of the word in each channel to said delay means to cause the bit-interlaced words to be circulated through said dynamic register means at successive bit times; selection circuit means coupled to said dynamic register means for selecting each of said information words therefrom on a serial bit-by-bit basis; control register means; logic circuitry coupling said selection circuit means to said control register means to pass the bit constituting said coded control word to said control register means; and selection matrix circuitry coupled to said selection circuit means and to said control register means to pass a selected one of said information words to a destination selected by the control word in said control register means.

2. The buffer circuit defined in claim 1 in which said logic circuitry simultaneously selects said one binary bit from each of said binary information words in said dynamic register means to derive said control word and introduces the selected bits in a parallel manner to said control register.

3. The buffer circuit defined in claim 1 in which said selection circuit means includes unit delay means having a plurality of taps at which the individual words in said dynamic register means respectively appear in a serial bit-by-bit basis.

References Cited by the Examiner

UNITED STATES PATENTS

| | | | |
|---|---|---|---|
| 2,905,930 | 9/1959 | Golden | 340—174 |
| 2,947,478 | 8/1960 | Lentz et al. | 235—160 |
| 2,974,867 | 3/1961 | Steele | 235—167 |
| 3,061,192 | 10/1962 | Terzian | 235—157 |
| 3,107,344 | 10/1963 | Baker et al. | 340—173 |
| 3,133,190 | 5/1964 | Eckert et al. | 235—159 |

ROBERT C. BAILEY, *Primary Examiner.*

I. S. KAVRUKOV, *Assistant Examiner.*